(12) United States Patent
Verma et al.

(10) Patent No.: US 11,704,749 B2
(45) Date of Patent: Jul. 18, 2023

(54) NETWORKED UTILITY SERVICES AND VEHICLE CHARGING STATIONS

(71) Applicant: Itron Global SARL, Liberty Lake, WA (US)

(72) Inventors: Dinkar Kumar Verma, Bengaluru (IN); Srikanth Kathe, Bangalore (IN); Ratnavel Nambirajan Subramanian, Bengaluru (IN); Badri Narayan Krishnan, Bengaluru (IN); Madhurima Jaiswal, Bengaluru (IN)

(73) Assignee: Itron Global SARL, Liberty Lake, WA (US)

( * ) Notice: Subject to any disclaimer, the term of this patent is extended or adjusted under 35 U.S.C. 154(b) by 377 days.

(21) Appl. No.: 16/694,225

(22) Filed: Nov. 25, 2019

(65) Prior Publication Data
US 2021/0158459 A1    May 27, 2021

(51) Int. Cl.
*G06Q 50/06* (2012.01)
*G06Q 20/08* (2012.01)
*B60L 53/66* (2019.01)
*G06Q 20/20* (2012.01)
*G06Q 20/40* (2012.01)

(52) U.S. Cl.
CPC ............ *G06Q 50/06* (2013.01); *B60L 53/665* (2019.02); *G06Q 20/085* (2013.01); *G06Q 20/202* (2013.01); *G06Q 20/40* (2013.01)

(58) Field of Classification Search
None
See application file for complete search history.

(56) References Cited

U.S. PATENT DOCUMENTS

| | | | | |
|---|---|---|---|---|
| 4,240,149 A * | 12/1980 | Fletcher | ................. | G01R 19/02 324/94 |
| 4,459,546 A * | 7/1984 | Arrington | ................. | G06J 1/00 708/835 |
| 5,151,865 A * | 9/1992 | Blessing | ............... | H01M 10/48 324/427 |
| 5,861,732 A * | 1/1999 | Takimoto | ................ | H02J 7/027 324/435 |
| 6,687,627 B1 * | 2/2004 | Gunn | ................... | G01R 21/133 73/863 |
| 7,656,649 B2 * | 2/2010 | Loy | ...................... | G01R 22/065 361/667 |

(Continued)

*Primary Examiner* — Fateh M Obaid
(74) *Attorney, Agent, or Firm* — Lee & Hayes, P.C.

(57) ABSTRACT

Networked utility services handle data-flow in a system to operate electrical vehicle charging stations. In an example, first and second utility companies may operate in first and second respective areas. A user may have a residence in the first area and may have an electric vehicle at a vehicle charging station in the second area. The user may provide identification at the vehicle charging station in the second area, and the user's vehicle may be charged at that location using electricity from the second utility. Data including the user's identification and the electricity consumed in the charging may be sent to the first utility serving the area including the user's residence. The first utility may bill the user for the electricity used to charge the user's vehicle at the remote vehicle charging station. The charging station, both utilities and/or other parties may share in the receipts.

20 Claims, 4 Drawing Sheets

(56) References Cited

U.S. PATENT DOCUMENTS

| | | | | |
|---|---|---|---|---|
| 8,035,341 B2* | 10/2011 | Genzel | ................ | B60L 53/31 |
| | | | | 320/109 |
| 8,246,376 B2* | 8/2012 | Amit | ................ | B60L 53/18 |
| | | | | 439/456 |
| 8,454,377 B2* | 6/2013 | Heichal | ................ | B60L 53/80 |
| | | | | 439/247 |
| D820,204 S * | 6/2018 | Urschel | ................ | D13/103 |
| 10,193,201 B2* | 1/2019 | Yadgar | ................ | H01M 10/484 |
| 10,256,662 B2* | 4/2019 | Baillot | ................ | H01M 10/465 |
| 10,330,725 B2* | 6/2019 | Tuckey | ................ | G06F 15/00 |
| 10,345,416 B2* | 7/2019 | Banhegyesi | ................ | G01R 35/00 |
| 10,421,462 B2* | 9/2019 | Lin | ................ | B60W 40/13 |
| 10,641,618 B2* | 5/2020 | Wang | ................ | G01D 4/002 |
| 11,054,476 B2* | 7/2021 | Gass | ................ | G01R 31/3828 |
| 2012/0093141 A1* | 4/2012 | Imes | ................ | G05D 23/1904 |
| | | | | 370/338 |
| 2013/0054758 A1* | 2/2013 | Imes | ................ | H04L 47/70 |
| | | | | 709/219 |
| 2014/0191848 A1* | 7/2014 | Imes | ................ | H04B 5/0031 |
| | | | | 340/10.5 |
| 2016/0084672 A1* | 3/2016 | Daenuwy | ................ | B60L 53/14 |
| | | | | 340/870.02 |
| 2018/0109047 A1* | 4/2018 | Hoang | ................ | H01R 13/73 |

* cited by examiner

NETWORKED UTILITY SERVICES AND VEHICLE CHARGING STATIONS

BACKGROUND

In many areas, too few electrical-vehicle charging stations are available, and the available charging stations tend to be more expensive for most motorists than charging at home. Payment issues also make available charging stations difficult to use for many motorists. Additionally, conventional data networks are not configured to access devices that provide more rapid and effective transaction validation. Accordingly, improvements would be welcome.

BRIEF DESCRIPTION OF THE DRAWINGS

The detailed description is described with reference to the accompanying figures. In the figures, the left-most digit(s) of a reference number identifies the figure in which the reference number first appears. The same numbers are used throughout the drawings to reference like features and components. Moreover, the figures are intended to illustrate general concepts, and not to indicate required and/or necessary elements.

DETAILED DESCRIPTION

Overview

Networked utility services (e.g., electricity companies) perform calculations and exchange data in a system to operate electrical vehicle charging stations over a region larger than that served by a single utility service. In an example, first and second utility companies may operate in first and second respective areas. A user may have a residence in the first area and may have an electric vehicle at a vehicle charging station in the second area. The user may provide identification at the vehicle charging station in the second area, and the user's vehicle may be charged at that location using electricity from the second utility. The identification may be provided by a cellular phone and/or any device that is with the customer or at the vehicle charging station with the required application running on it and which is capable of communicating with a server (e.g., a server of the vehicle charging station). Data including the user's identification and the electricity consumed in the charging may be sent to the first utility serving the area including the user's residence. The first utility may bill the user for the electricity used to charge the user's vehicle at the remote vehicle charging station in the region of the second utility. The charging station, both utilities and/or other parties may share in the receipts.

Example System and Techniques

Figure 1:
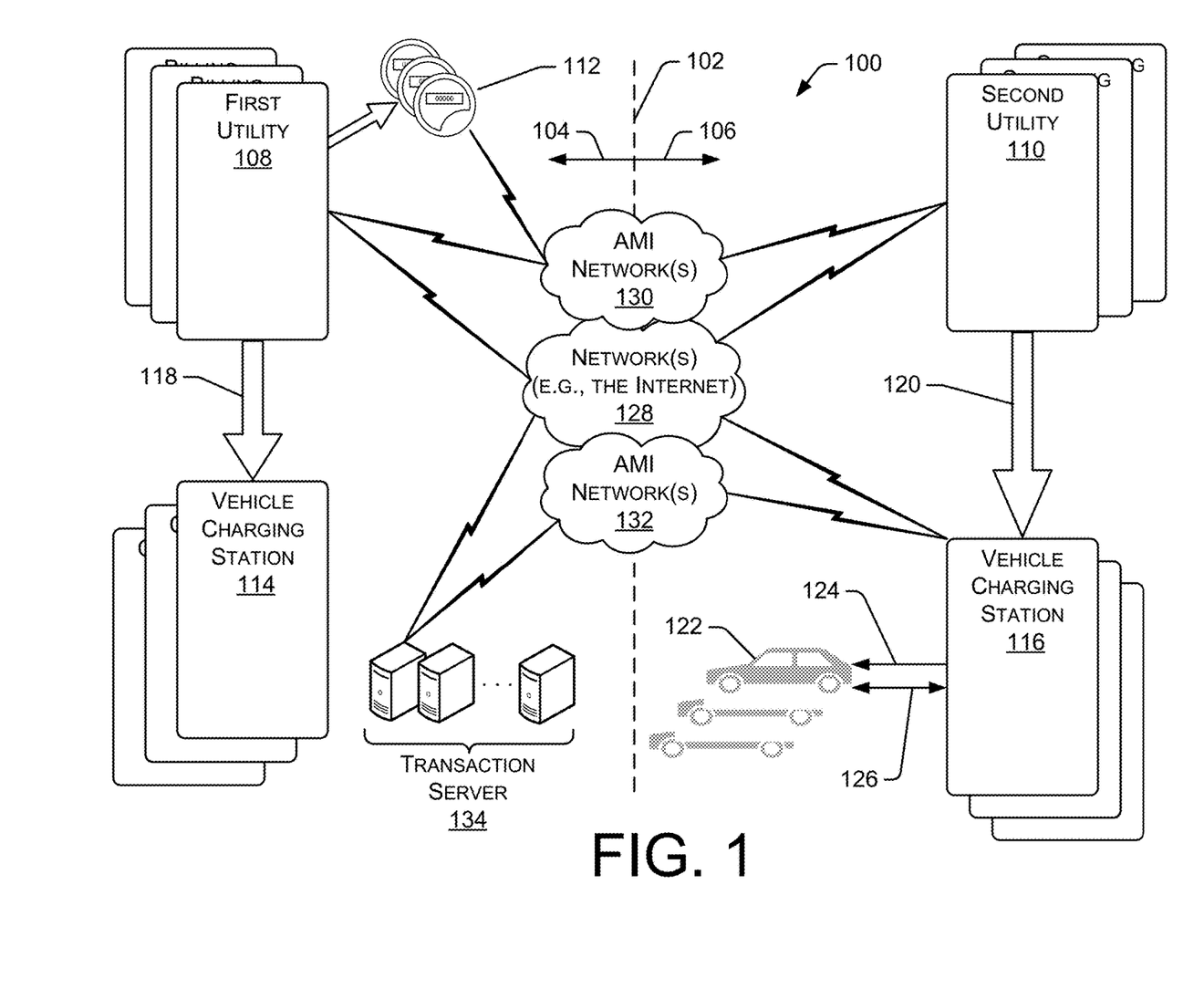
FIG. 1 is a diagram showing an example layout of a system configured for networked utility services and vehicle charging stations.

FIG. 1 shows an example layout of a system 100 including networked utility services and vehicle charging stations. In the example system 100, line 102 shows an example boundary between the service areas 104, 106 of a first utility company 108 and a second utility company 110, respectively. In the system 100, a customer's electricity meter 112 is located within the territory 104 of the first utility company 108. While the customer's (or user's) electricity meter 112 is shown, the meter is associated with a residence, business, address and/or other site of the customer (now shown). Accordingly, the utility company 108 would bill the customer for the electricity measured by the meter 112 and used by the customer. The customer metering device 112 is representative of many metering devices associated with each of utilities 108, 110.

In the system 100, the first utility 108 and the second utility 110 each supply electricity to a plurality of vehicle-charging stations 114, 116, respectively. In the example system 100, appropriate power transmission lines 118, 120 provide electricity to the vehicle charging stations associated with the two utility companies, respectively. In an example, the vehicle charging stations 114, 116 are distributed over the territories 104, 106 of the two utilities 108, 110, and the power transmission lines 118, 120 are appropriately located to provide power to the two respective groups of vehicle-charging stations 114, 116.

In the example system 100, a plurality of electrically-powered vehicles 122 is shown being charged by one or more of the vehicle-charging stations 116 within the territory 106 of the second utility 110. In the example system 100, a vehicle is being charged by a power cord 124, which may include an electrical supply connection suitable for fast-charge and/or high-amperage conditions. A two-way data line 126 allows the charging station 116 to communicate with the vehicle 122 before charging (e.g., for verifying an identity and/or account of a user) and as it is charged (e.g., for feedback regarding the charging process).

A network 128 may be the internet or other network, such as a private network, cellular network, etc. In the example system 100, two advanced metering infrastructure (AMI) networks 130, 132 are representative of a plurality of such networks, one or more of which that may be used by one or more utility companies to acquire, transmit and receive data. In the system 100, the network 128 and AMI networks 130, 132 may act singly or in combination to provide data connectivity between customer metering devices and various utility companies 108, 110, vehicle charging stations 114, 116, transaction server(s) 134, and/or customer metering devices 112. Accordingly, the AMI networks 130, 132 may allow the system 100 to avoid dependence (in full or in part) on the internet and/or cellular networks for communications.

In the example system 100, each of the utilities 108, 110 is configured to perform both power-supplying and customer-billing functions. In such systems, each utility 108, 110 would supply power to customers in a geographic area or to certain type(s) of customers in a geographic area. The utility would also perform customer-billing functions to bill those customers for the electricity provided to them.

In the example of system 100, each utility 108, 110 may additionally provide customer-billing functionality to bill its own customers for electricity used to charge the customers' vehicles in vehicle-charging stations located in an area of a different utility. In an example, a customer associated with electricity meter 112 in region 104 of utility 108 may drive an electric car 122 to vehicle charging station 116 in the area 106 of utility 110. In the example, utility 110 would supply the vehicle charging station 116 with the electricity over electric grid 120 to charge the vehicle 122. However, the user or customer—i.e., the owner and driver of vehicle 122—would be billed by utility 108. This is because utility 108 has an existing relationship with the customer, and has the knowledge required (customer name, address, account number, etc.) to bill the customer. Accordingly, the customer would be billed for electricity used by the customer's residence and for electricity measured by the customer's metering device 112, and additionally for the electricity provided by utility 110 and used at charging station 116 to charge the customer's vehicle 122.

In the example of system 100, a customer has a residence with an electricity meter 112 with a service-region 104 of utility 108. The customer may also have a vehicle 122 that is charged by a vehicle charging station 116 that is within a service-region 106 of utility 110. Accordingly, the electricity for the charging the vehicle is provided by the utility 110. However, the customer is billed by utility 108. Accordingly, a transaction may be result in division of the payment made by the customer into three or more component portions, including splits for the utility 110 that supplied the electricity, the vehicle charging station 116 that performed the charging, and the utility 108 of the customer, which billed and collected the money from the customer. Additional allocations may be made for the networks 130, 132 used during the charging, calculations, billing, etc. The calculations involved, the electrical metering and delivery, the identity validations, the transaction approvals, etc., may be performed, monitored, recorded and/or managed by one or more servers. Herein, the term "server" comprises any computing device configured for data processing and for data communications over a network.

In the example of FIG. 1, a transaction server 134 may be a standalone server or may be instantiated within a server of a utility (e.g., a server of one or both utilities 108, 110), or a server of a vehicle charging station (e.g., a server of charging station 116), or another server. The transaction server 134 may be configured to perform data acquisition, data calculations, data communications, data verifications, and other functions. In an example, the transaction server 134 may determine an identification of the customer, validate the customer's account with a remote utility, acquire a transaction approval, acquire metering information, and perform a financial settlement function indicating party(s) to which money is owed and party(s) from which payment is indicated. The transaction server 134 may additionally communicate with financial institutions regarding payments, credits, balances, etc.

The utility 108 may have one or more vehicle charging stations 114 within an area 104 associated with its customer base. Accordingly, the vehicle charging stations 114 would receive power over transmission lines 118 from the utility 108. Vehicles from within the region 104 served by utility 108 and vehicles from other areas (e.g., area 106) might be charged by the stations 114. The vehicles would be billed by the utility associated with the residence of each vehicle's owner.

Example Methods

In some examples of the techniques discusses herein, the methods of operation may be performed by one or more application specific integrated circuits (ASIC) or may be performed by a general-purpose processor utilizing software defined in computer readable media. In the examples and techniques discussed herein, the memory may comprise computer-readable media and may take the form of volatile memory, such as random-access memory (RAM) and/or non-volatile memory, such as read only memory (ROM) or flash RAM. Computer-readable media devices include volatile and non-volatile, removable and non-removable media implemented in any method or technology for storage of information such as computer-readable instructions, data structures, program modules, or other data for execution by one or more processors of a computing device. Examples of computer-readable media include, but are not limited to, phase change memory (PRAM), static random-access memory (SRAM), dynamic random-access memory (DRAM), other types of random access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transitory medium that can be used to store information for access by a computing device.

As defined herein, computer-readable media does not include transitory media, such as modulated data signals and carrier waves, and/or signals.

Figure 2:
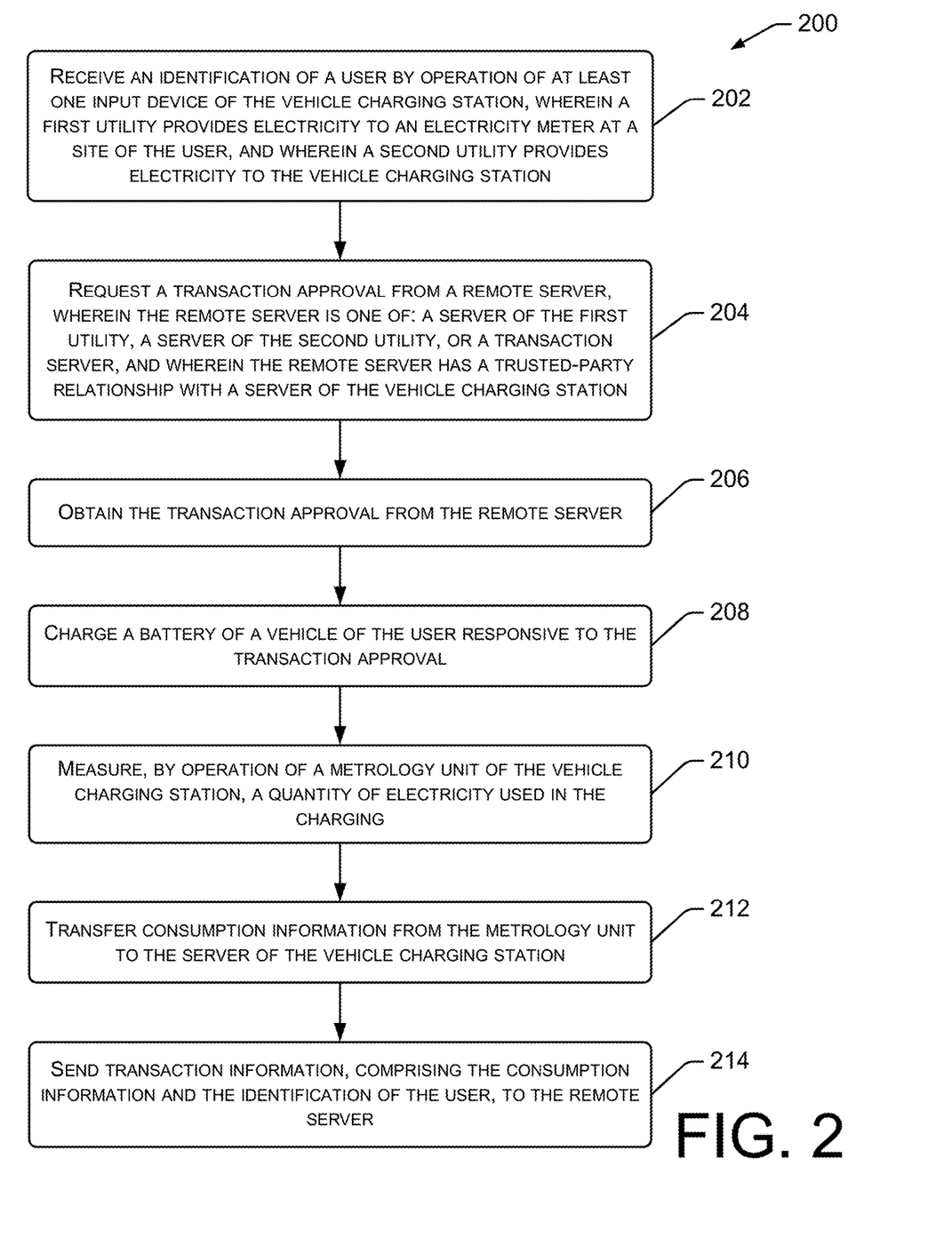
FIG. 2 is a flow diagram showing an example method by which a vehicle charging station may be operated.

FIG. 2 shows an example method 200 by which a vehicle charging station may be operated. At block 202, an identification of a user is received, which may be based at least in part on input device of the vehicle charging station. In an example, a first utility provides electricity to an electricity meter at a site of the user, and a second utility provides electricity to the vehicle charging station.

In one example of receiving the identification of the user, the user may provide one or more alpha-numeric strings representing an identity of the first utility and representing an identity of the electricity meter at the site of the user. The user may provide the string(s) by any of several techniques and using any of several devices. In a first example, the user may provide information by swiping a magnetic card in a card reader. In the example, a magnetic card is a card with a magnetic memory stripe or device on at least one side of the card. In a second example, the user may provide information inserting a smartcard (e.g., a card with an integrated circuit for information processing) in a card reader. In an example, a smartcard may be a pocket-sized device having an integrated circuit for data processing and/or data storage that provides and/or exchanges information with a "reader" device, either by insertion, swiping, near-field communications, etc. In a third example, the user may provide information by operating of a cellphone application and near-field communications, or vehicle-based application (e.g., running on an Android or other operating system radio or entertainment center). In other examples, other techniques and/or devices may be used to receive user information as indicated by design requirements. In a further example, data may be obtained from the user by an application operating on a computing device of a kiosk of the vehicle charging station. The kiosk may include card readers, near-field radio, applications available to the user, biometric sensors, and/or other devices to obtain data from users that tends to verify the identity, residence, account(s), etc. of users.

In a further example of receiving the identification of the user at the vehicle charging station, the information may be received by operation of one or more of devices including: a cellphone of the user; a smartcard of the user; the electricity meter at the site of the user; and/or the vehicle of the user.

At block 204, a transaction approval is requested from a remote server. In an example, the remote server is one of: a server of the first utility, a server of the second utility, or a transaction server. In the example, the remote server has a trusted-party relationship with a server of the vehicle charging station.

At block 206, the transaction approval is obtained from the remote server. In an example, obtaining the transaction approval from the remote server may include communicating with the remote server to verify an account of the user. In a further example, the communication may be performed over an advanced metering infrastructure (AMI) network. Referring to FIG. 1, one or more of the AMI networks 130, 132 may be used for communications between the vehicle charging station 116 and remote servers 108, 110 of different utilities and/or the transaction server 134. In a further example, obtaining the transaction approval from the remote server may include receiving a transaction identifying code from the remote server. Sending the transaction information may include sending one or more of the transaction-identifying code, the identification of the user, and the measured quantity of electricity in an encrypted format.

At block 208 and responsive to the transaction approval, a battery of a vehicle of the user is charged. In an alternative example, the partially-discharged battery of the user may be replaced with a charged battery.

At block 210, a quantity of electricity used in the charging is measured. In an example, the measurement is made by operation of a metrology unit of the vehicle charging station.

At block 212, consumption information from the metrology unit is transferred to the server of the vehicle charging station.

At block 214, transaction information is sent to the remote server. In an example, the transaction information may include the consumption information and the identification of the user. In an example, the transaction information may be sent to the server of the first utility at least in part using one or more AMI networks.

Figure 3:
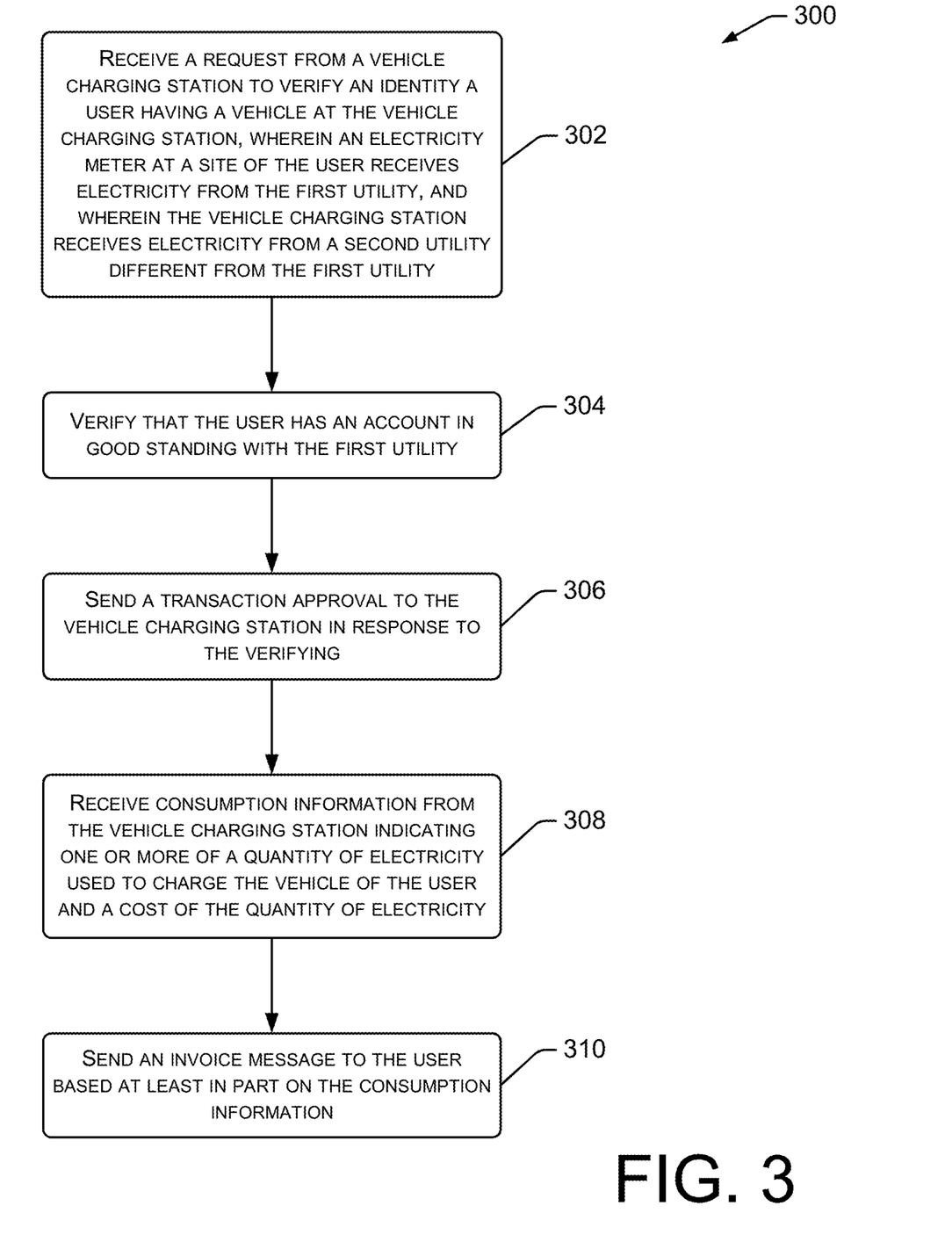
FIG. 3 is a flow diagram showing an example method by which a server of a utility company may be operated.

FIG. 3 shows an example method 300 by which a first server of a first utility company may be operated. In the example, a customer having a residence in the service area of the first utility travels out of the service area, and into the service area of a second utility. An electrical vehicle charging station in the second service area requests that the first server of the first utility verify the customer. The first server verifies the customer, and the customer's vehicle is charged. The first utility bills the customer (who has an existing account with the first utility), and the revenue is shared with the second utility (which provided the electricity) and the vehicle charging station (which provided the service).

At block 302, a request from a vehicle charging station to verify an identity a user having a vehicle at the vehicle charging station is received at the server of the utility company. The request may travel, at least in part, over one or more AMI networks. In an example, an electricity meter at a site (e.g., the residence) of the user may receive electricity from the first utility, and the vehicle charging station may receive electricity from a second utility different from the first utility.

At block 304, the server at the utility serving the user's residence verifies that the user has an account in good standing with the first utility. In an example, verifying that the user has the account in good standing may include accessing a file of the account of the user. The file of the account of the user may data obtained at least in part by the electricity meter at the site of the user, as well as records of payment, credit information, etc. The verification may include verifying the identification that the user presented to the vehicle charging station against information in the file of the account of the user.

The account of the user may be updated, as required. In an example, the file of the account of the user may be updated to indicate new vehicles of one or more residents of the residence or site served by the metering device associated with the account. Additionally, the account may be accessed to verify that the vehicle at the vehicle charging station is listed within the file of the account of the user.

At block 306 and in response to the verifying, a transaction-approval is sent by the server of the user's utility to the vehicle charging station.

At block 308, consumption information is received (e.g., at the server at the utility supplying the user's residence) from the vehicle charging station indicating one or more of a quantity of electricity used to charge the vehicle of the user and a cost of the quantity of electricity. In an example, receiving the consumption information from the vehicle charging station may include accessing a file of an account of the user and updating the file of the account of the user to include the consumption information.

At block 310, an invoice (message, packet(s), etc.) is sent to the user based at least in part on the consumption information.

In the example method 300, the first utility verified its own customer who traveled out-of-area to a charging station with an area of a second utility. In a further example, the first utility provides electricity to a vehicle charging station within its service area. A customer has an account with a second utility, different from the first utility. In the example, compensation collected by the second utility and a portion of the collections are received by the first utility for the electricity provided to the second vehicle charging station.

Figure 4:
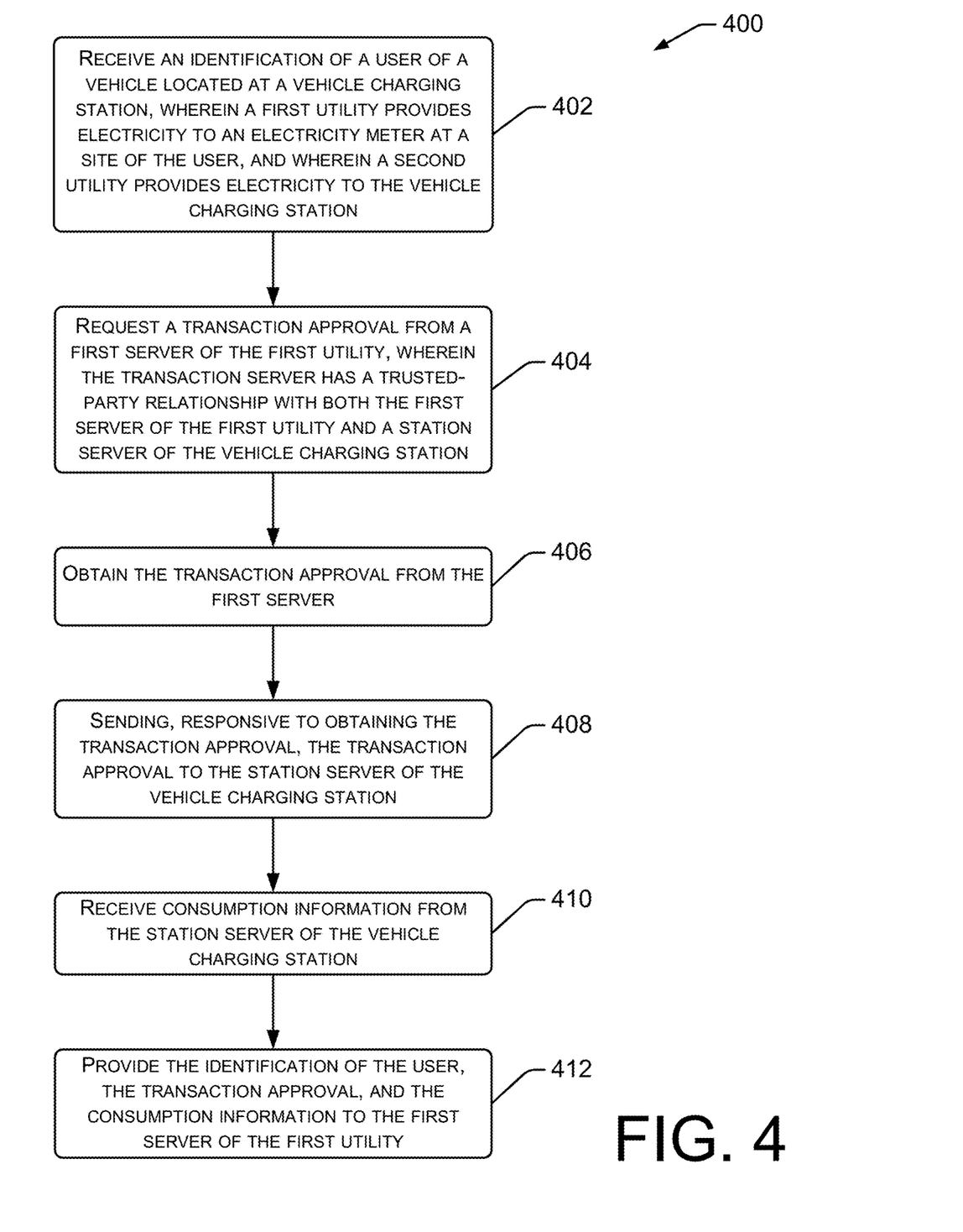
FIG. 4 is a flow diagram showing an example method by which a transaction server configured for networked utility services and vehicle charging stations may be operated.

FIG. 4 shows an example method 400 by which a server of a transaction server configured for networked utility services and vehicle charging stations may be operated.

At block 402, an identification of a user of a vehicle located at a vehicle charging station is received (e.g., at the transaction server). In an example, a first utility provides electricity to an electricity meter at a site of the user and a second utility provides electricity to the vehicle charging station. In an example, receiving the identification could include receiving data that uniquely identifies the user and the first utility that provides electricity to the electricity meter at the site of the user. In a further example, the station server of the vehicle charging station may receive information obtained from a smartcard of the user and/or an application running on a cellphone of the user. Such information may be gathered by card readers, near field communication radios, etc.

At block 404, a transaction-approval is requested from a first server of the first utility. In an example, the transaction server has a trusted-party relationship with both the first server of the first utility and a station server of the vehicle charging station.

At block 406, the transaction-approval is obtained from the first server.

At block 408 and responsive to obtaining the transaction approval, the transaction approval is sent to the station server of the vehicle charging station.

At block 410, consumption information is received (e.g., at the transaction server) from the station server of the vehicle charging station.

At block 412, information is provided by the transaction server to the server of the first utility (i.e., the utility serving the residence of the user). The information provided may include the identification of the user, the transaction approval, and the consumption information.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

The invention claimed is:

1. A method of operating a vehicle charging station, the method comprising:
   receiving an identification of a user based at least in part on input data from an input device of the vehicle charging station, wherein a first utility provides electricity to an electricity meter at a site of the user, and wherein a second utility provides electricity to the vehicle charging station;
   requesting a transaction approval from a remote server, wherein the remote server is a server of the first utility, and wherein the remote server has a trusted-party relationship with a server of the vehicle charging station;
   obtaining the transaction approval from the remote server;
   charging a battery of a vehicle of the user responsive to the transaction approval;
   measuring, by using a metrology unit of the vehicle charging station, a quantity of electricity used in the charging;
   transferring data indicating the quantity of electricity from the metrology unit to the server of the vehicle charging station; and
   sending transaction information, comprising the data indicating the quantity of electricity and the identification of the user, to the remote server.

2. The method of claim 1, wherein receiving the identification of the user comprises receiving an alpha-numeric string representing an identity of the first utility and an alpha-numeric string representing an identity of the electricity meter at the site of the user.

3. The method of claim 1, wherein receiving the identification of the user comprises at least one of:
   receiving information from a smartcard of the user;
   receiving information from an application running on a vehicle of the user;
   receiving information from an application running on a kiosk of the vehicle charging station; and
   receiving information from an application running on a cellphone of the user.

4. The method of claim 1, wherein obtaining the transaction approval from the remote server comprises:
   communicating with the remote server to verify an account of the user, wherein the communicating is performed over an advanced metering infrastructure (AMI) network.

5. The method of claim 1, wherein:
   obtaining the transaction approval from the remote server comprises obtaining the transaction approval from the server of the first utility at least in part using an advanced metering infrastructure (AMI) network; and
   sending the transaction information comprises sending the transaction information to the server of the first utility at least in part using the AMI network.

6. The method of claim 1, wherein:
   obtaining the transaction approval from the remote server comprises receiving a transaction identifying code from the remote server; and
   sending the transaction information comprises sending the transaction identifying code, the identification of the user, and the data indicating the quantity of electricity in an encrypted format.

7. The method of claim 1, wherein receiving the identification of the user comprises receiving information from at least two of devices comprising:
   a cellphone of the user;
   a smartcard of the user;
   the electricity meter at the site of the user; and
   the vehicle of the user.

8. One or more non-transitory computer-readable media storing computer-executable instructions that, when executed by one or more processors, configure a computing device of a vehicle charging station to perform acts comprising:
   receiving an identification of a user based at least in part on input data from an input device of the vehicle charging station, wherein a first utility provides electricity to an electricity meter at a site of the user, and wherein a second utility provides electricity to the vehicle charging station;
   requesting a transaction approval from a remote server, wherein the remote server is a server of the first utility, and wherein the remote server has a trusted-party relationship with a server of the vehicle charging station;
   obtaining the transaction approval from the remote server;
   charging a battery of a vehicle of the user responsive to the transaction approval;
   measuring, by using a metrology unit of the vehicle charging station, a quantity of electricity used in the charging;
   transferring data indicating the quantity of electricity from the metrology unit to the server of the vehicle charging station; and
   sending transaction information, comprising the data indicating the quantity of electricity and the identification of the user, to the remote server.

9. The non-transitory computer-readable media of claim 8, wherein receiving the identification of the user comprises receiving an alpha-numeric string representing an identity of the first utility and an alpha-numeric string representing an identity of the electricity meter at the site of the user.

10. The non-transitory computer-readable media of claim 8, wherein receiving the identification of the user comprises:
    receiving information from a smartcard of the user or an application running on a cellphone of the user; and
    receiving information from an application running on a vehicle of the user.

11. The non-transitory computer-readable media of claim 8, wherein obtaining the transaction approval from the remote server comprises:
    communicating with the remote server to verify an account of the user, wherein the communicating is performed over an advanced metering infrastructure (AMI) network.

12. The non-transitory computer-readable media of claim 8, wherein:
    obtaining the transaction approval from the remote server comprises obtaining the transaction approval from the server of the first utility at least in part using an advanced metering infrastructure (AMI) network; and
    sending the transaction information comprises sending the transaction information to the server of the first utility at least in part using the AMI network.

13. The non-transitory computer-readable media of claim 8, wherein:
    obtaining the transaction approval from the remote server comprises receiving a transaction identifying code from the remote server; and sending the transaction information comprises sending the transaction identifying code, the identification of the user, and the data indicating the quantity of electricity in an encrypted format.

14. The non-transitory computer-readable media of claim 8, wherein receiving the identification of the user comprises receiving information from at least two of devices comprising:
  a cellphone of the user;
  a smartcard of the user;
  the electricity meter at the site of the user; and
  the vehicle of the user.

15. A vehicle charging station, comprising:
  a metrology unit; and
  a server of the vehicle charging station, configured to perform acts, comprising:
    receiving an identification of a user based at least in part on input data from an input device of the vehicle charging station, wherein a first utility provides electricity to an electricity meter at a site of the user, and wherein a second utility provides electricity to the vehicle charging station;
    requesting a transaction approval from a remote server, wherein the remote server is a server of the first utility, and wherein the remote server has a trusted-party relationship with a server of the vehicle charging station;
    obtaining the transaction approval from the remote server;
    charging a battery of a vehicle of the user responsive to the transaction approval;
    measuring, by using the metrology unit of the vehicle charging station, a quantity of electricity used in the charging;
    transferring data indicating the quantity of electricity from the metrology unit to the server of the vehicle charging station; and
    sending transaction information, comprising the data indicating the quantity of electricity and the identification of the user, to the remote server.

16. The vehicle charging station of claim 15, wherein receiving the identification of the user comprises receiving an alpha-numeric string representing an identity of the first utility and an alpha-numeric string representing an identity of the electricity meter at the site of the user.

17. The vehicle charging station of claim 15, wherein receiving the identification of the user comprises at least one of:
  receiving information from a smartcard of the user;
  receiving information from an application running on a vehicle of the user;
  receiving information from an application running on a kiosk of the vehicle charging station; and
  receiving information from an application running on a cellphone of the user.

18. The vehicle charging station of claim 15, wherein obtaining the transaction approval from the remote server comprises:
  communicating with the remote server to verify an account of the user, wherein the communicating is performed over an advanced metering infrastructure (AMI) network.

19. The vehicle charging station of claim 15, wherein:
  obtaining the transaction approval from the remote server comprises obtaining the transaction approval from the server of the first utility at least in part using an advanced metering infrastructure (AMI) network; and
  sending the transaction information comprises sending the transaction information to the server of the first utility at least in part using the AMI network.

20. The vehicle charging station of claim 15, wherein:
  obtaining the transaction approval from the remote server comprises receiving a transaction identifying code from the remote server; and
  sending the transaction information comprises sending the transaction identifying code, the identification of the user, and the data indicating the quantity of electricity in an encrypted format.

* * * * *